Oct. 20, 1970   R. E. GOTTFRIED ET AL   3,535,458
ANALOG MULTIPLEXING SYSTEM USING A SEPARATE COMPARATOR
FOR EACH ANALOG INPUT
Filed July 24, 1967   3 Sheets-Sheet 1

INVENTORS
ROBERT E. GOTTFRIED
BARRY DUNBRIDGE
BY Lindenberg + Freilich
ATTORNEYS INVENTOR.
ROBERT E. GOTTFRIED
BARRY DUNBRIDGE
BY Lindenberg + Freilich

ATTORNEYS

INVENTORS
ROBERT E. GOTTFRIED
BARRY DUNBRIDGE
BY
Lindenberg + Freilich
ATTORNEYS

United States Patent Office 3,535,458
Patented Oct. 20, 1970

3,535,458
ANALOG MULTIPLEXING SYSTEM USING A SEPARATE COMPARATOR FOR EACH ANALOG INPUT
Robert E. Gottfried and Barry Dunbridge, Torrance, Calif., assignors to TRW Inc., Redondo Beach, Calif., a corporation of Ohio
Filed July 24, 1967, Ser. No. 655,512
Int. Cl. H04j 3/04
U.S. Cl. 179—15
9 Claims

ABSTRACT OF THE DISCLOSURE

A system for sequentially sampling a plurality of analog signal sources for producing a time multiplexed output signal. The system incorporates a different comparison means for each source. The outputs of all of the comparison means are connected together to a common output means. An analog trial signal is derived from the output means and fed back to all of the comparator means. Only one comparator means is "on" at a time. The "off" comparator means do not load the source of the trial signal but instead isolate the analog signal sources connected thereto from the output means.

BACKGROUND OF THE INVENTION

This invention relates to a system for sequentially sampling a plurality of analog signal sources for producing a time multiplexed output signal.

Various communication and data processing system applications require that a number of analog signals be sequentially sampled to produce a time multiplexed output signal. Intermediate processing may be used to convert each analog signal into a digital representation and the output is then referred to as time multiplexed PCM (pulse code modulation). In the case where intermediate processing converts each analog sample value into a corresponding proportional interval of time, the output is referred to as time multiplexed PDM (pulse duration modulation). In the case where no intermediate processing is performed, the output is referred to as time multiplexed PAM (pulse amplitude modulation).

In all these cases, a fundamental approach has been to commutate or multiplex the analog input signals to a common output. Each analog input signal is normally coupled to the common output by a separate analog switch. Only one switch is turned on at a time and therefore the selected analog signal is coupled either directly (PAM) or through intermediate processing to the output. Generally, electronic analog switches are employed because of speed and reliability. Although these switches have reached a rather advanced state of development, they still have certain characteristics which give rise to significant problems. For example, an analog switch when turned "on" is not ideal but has nonzero resistance and voltage offset, both factors being responsible for errors. Secondly, in the "off" condition, each switch contributes a leakage current to the output. Since the output of many switches are tied in common, this leakage current becomes multiplied by the number of "off" switches. This total current flows into or out of the output and is also responsible for a voltage offset error. Additionally, although each "off" switch should ideally be completely isolated from the input, this is as a practical matter not possible and as a consequence each analog signal source is both conductively and capacitively loaded. This capacitive loading from the output of each switch becomes multiplied by the number of switches in parallel and therefore creates a stabilization problem. As an example, a newly selected analog signal source must charge this capacity to the final voltage within an accuracy consistent with the encoding accuracy. For instance, if one analog input signal was five volts and the next selected signal is zero volts, the distributed capacitance charged at five volts would have to fully discharge to zero volts in order to avoid error.

SUMMARY OF THE INVENTION

The present invention is directed to an analog multiplexing system which avoids the aforeset forth disadvantages of prior art systems by completely eliminating the use of analog switches.

More particularly, embodiments of the present invention employ a separate comparator for each different analog input signal. Each comparator is either enabled (on) or disabled (off). By having only one comparator "on" at a time, the analog input sources connected to the "off" comparators are all isolated from and do not contribute to the development of the multiplexed output signal. The "on" comparator provides a binary output signal indicative of whether or not the applied analog input signal exceeds an analog trial signal representing the multiplexed output signal.

A significant feature of the present invention involves the introduction of an improved comparator means which appears to the trial signal source as an open circuit when in an "off" state. Moreover, it is only the "on" comparator means which consumes any power. Briefly, a comparator means in accordance with the invention is comprised of a comparator in the form of a high gain open loop differential amplifier together with switching or gating circuitry. When the input selection signal to the gating circuitry of a comparison means is false, the comparison means consumes no power. Rather, the inputs to the comparator are reverse biased permitting all the outputs of all the comparators to be tied directly together.

It is pointed out that although the use of a separator comparator for each analog input may have been economically unfeasible prior to the advent of integrated microelectronic circuits, modern fabrication techniques make the concept of the present invention very practical indeed. In addition to reducing costs, integrated circuit techniques enable embodiments of the present invention to be employed in aerospace applications in which weight and volume constraints prevent the use of discrete component circuits.

DESCRIPTION OF THE PREFERRED EMBODIMENTS

Figure 1:
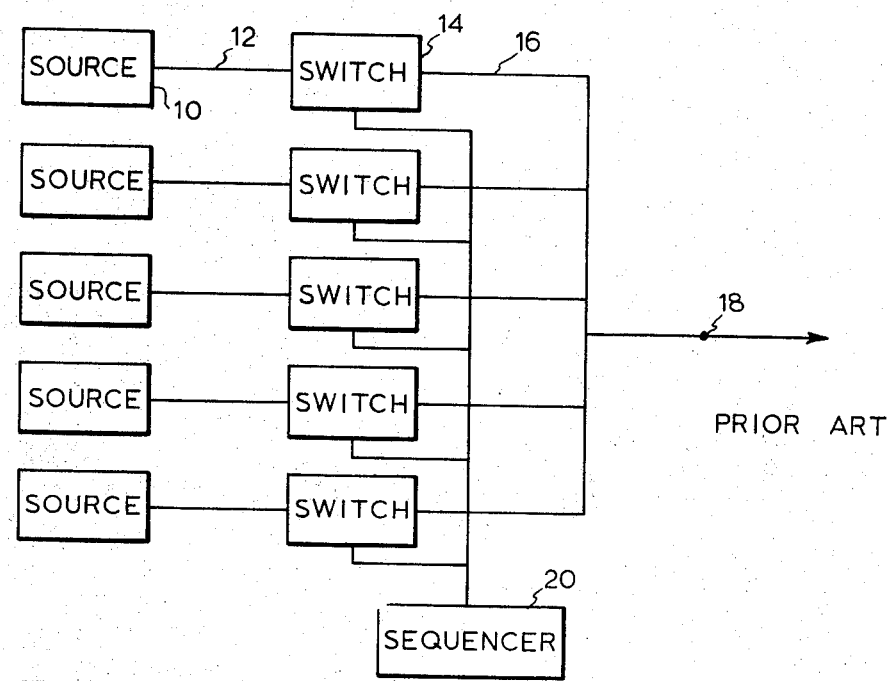
FIG. 1 is a block diagram of a typical prior art analog multiplexing system.

Attention is now called to FIG. 1 of the drawings which illustrates a typical prior art analog multiplexing system for providing a PAM (pulse amplitude modulation) multiplexed output signal. The system of FIG. 1 includes a plurality of distinct analog signal sources 10 each providing an analog output signal on an output terminal 12. Each of the output terminals 12 is coupled to the input of a different analog switch 14. The output terminals 16 of all of the switches 14 are connected in common to a system output terminal 18. Normally, the switches 14 can define either a closed or on state or an open or off state. When a switch is on, it is intended to faithfully couple an analog signal provided by the source 10 connected thereto to the system output terminal 18. On the other hand, when a switch 14 is off, ideally it should introduce an open circuit between the source 10 connected thereto and the output terminal 18. The state of the switches 14 is controlled by a sequencing means 20.

Figure 2:
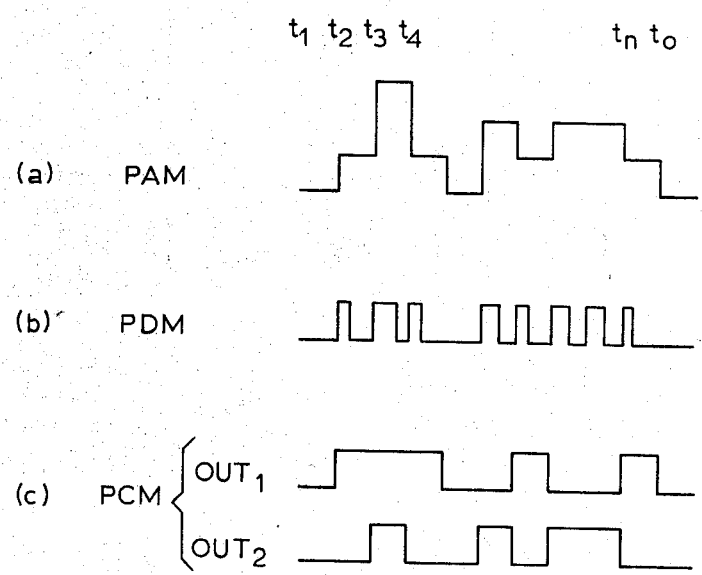
FIG. 2 is a waveform chart illustrating three forms of time multiplexed signals.

FIG. 2(a) illustrates a time multiplexed PAM output which might be supplied by the system of FIG. 1 at the system output terminal 18. The sequencer 20 is intended to cyclically define time periods $t_o$–$t_n$ and during each time period, a different switch 14 is closed to thus couple a different source 10 to the system output terminal 18. As a consequence, the amplitude of the output signal available at terminal 18 will vary in accordance with the sampled analog signals as is arbitrarily illustrated in FIG. 2(a).

In practice, it is necessary that the switches 14 be electronic because of the speed and reliability normally required. Ideally, when a switch 14 is closed, it should directly couple the source 10 connected thereto to the output terminal 18 and when it is open, it should establish a perfect open circuit between a source 10 and the terminal 18. However, although the state of the switch art has reached a rather advanced stage of development, all known analog switches are not ideal and consequently can introduce serious inaccuracies. For example only, when an off analog switch 14 is turned on, it introduces finite resistance and offset which therefore prevent the signal at terminal 18 from exactly following the signal provided by source 10. Additionally, when off, each switch normally contributes a leakage current to the terminal 18 and since the switches 14 are tied in common, this leakage current becomes multiplied by the number of off switches. The total leakage current introduces a further offset error. Still further, although it would be desirable to completely isolate the switch driving means (not shown) from the analog signal path, as a practical matter, the driving means capacitively loads the output of each switch 14. Therefore, a stabilization problem is created. As an example, a newly selected analog signal source 10 must initially charge the capacities load to the final voltage with an accuracy consistent with the desired encoding accuracy. For instance, if a five volt analog signal is provided by one source 10, and the next selected source provides a zero volt signal, the distributed capacitance charged at five volts must now be fully discharged to zero volts.

Figure 3:
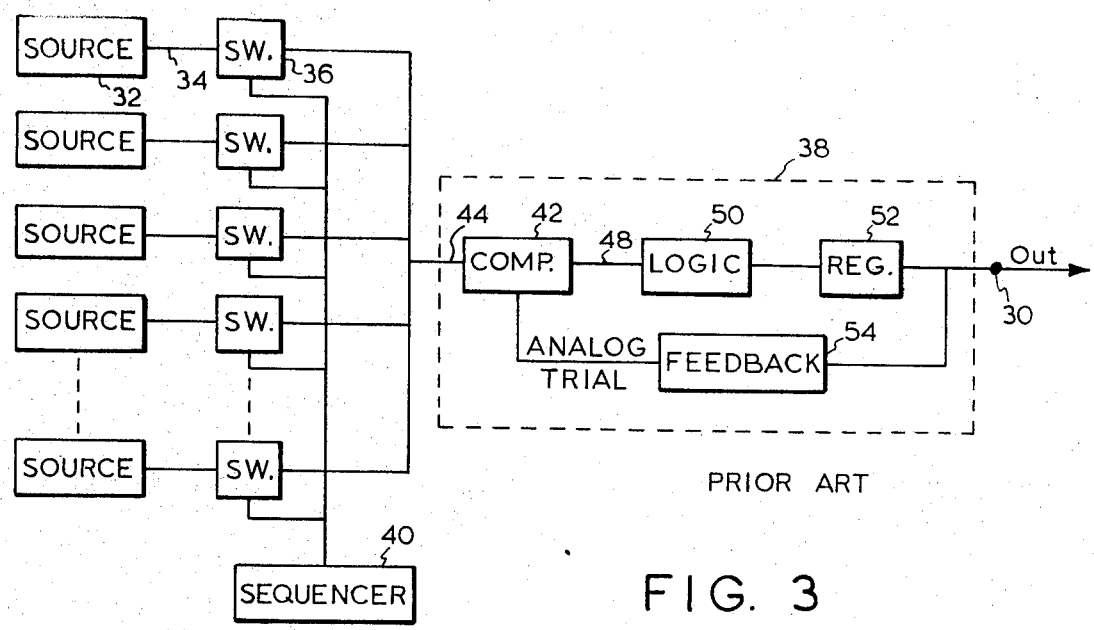
FIG. 3 is a more detailed block diagram of a typical prior art analog multiplexing system.

FIG. 2(a) illustrates an arbitrary PAM time multiplexed output which can be provided by the typical system of FIG. 1. FIG. 3 illustrates a block diagram of prior art multiplexing systems for providing a PDM (pulse duration modulation) or PCM (pulse code modulation) output. FIGS. 2(b) and 2(c) respectively illustrate arbitrary PDM and PCM output signals.

In the typical prior art system as shown in FIG. 3, it is desired to provide a PDM or PCM output signal at system output terminal 30 in response to the signals provided by analog signal sources 32. The output terminals 34 of analog signal sources 32 are each connected to a different analog switch 36. The output terminals of the analog switches 36 are connected in common and through an intermediate processing network 38 to the system output terminal 30. As before, a sequencing means 40 controls the states of the switches 36.

Regardless of whether the system of FIG. 3 is utilized to develop a PDM output or a PCM output, the intermediate processing network 38 basically consists of a comparator 42 having first and second input terminals 44 and 46. The output terminals of the switches 36 are connected in common to the comparator input terminal 44. The comparator 42 functions to compare the amplitude of the analog signal applied to terminal 44 with the amplitude of an analog trial signal applied to terminal 46. The comparator 42 provides an output signal on terminal 48 indicative of the relative amplitudes of the signals applied to terminals 44 and 46. The output terminal 48 is connected through logic circuitry 50 to a register 52. The output of the register 52 is connected to the system output terminal 30 and to a feedback means 54 which provides the analog trial signal to the terminal 46.

In the situation where the system of FIG. 3 is utilized to produce a PDM output as shown in FIG. 2(b), it is necessary for the intermediate processing network 38 to provide a pulse during each time period having a duration related to the amplitude of the analog signal applied to comparator input terminal 44. In order to do this, at the beginning of a time period, a flip-flop circuit (not shown but contained in logic circuitry 50, for example) is set. When this flip-flop circuit is set, a ramp generator (not shown) in feedback network 54 is enabled to thus develop the analog trial signal which is applied to terminal 46. When the amplitude of the analog trial signal equals the amplitude of the analog signal applied ot terminal 44, the flip-flop is reset. The output of the flip-flop can therefore define the PDM output shown in FIG. 2(b) in which each pulse has a duration directly related to the amplitude of an analog signal provided by a different source 32. The register 52 can incrementally count in response to a clock pulse source (not shown) while the flip-flop of the logic circuitry 50 is true. Thus the register 52 will store a number at the end of each time period which is directly related to the pulse duration and thus the amplitude of an analog signal provided by one of the sources 32.

The general block diagram of FIG. 3 can also be utilized to explain the PCM output shown in FIG. 2(c). In the case of the PCM output, it is assumed that two binary digits are sufficient to represent four different quantized levels of analog signal provided by sources 32. The two binary signals provided during each time period can be provided serially or in parallel. In any event, the logic circuitry 50 during each time period successively increments the digital representations which are stored in register 52 for so long as the comparator 42 indicates that the analog signal applied to terminal 44 exceeds the analog trial signal applied to terminal 46. In the case of a multiplexed PCM output, the feedback network 54 should include a digital to analog converter. Thus as the digital representation in register 52 is incrementally increased, the feedback network 54 will increase the amplitude of the analog trial signal applied to terminal 46. When the amplitude of the analog trial signal equals the amplitude of the signal applied to terminal 44, the logic circuitry 50 will cease to increment the digital representation in register 52. At that time, the register 52 will store a binary representation of the level of the analog signal most recently applied to terminal 44.

The systems shown in FIGS. 1 and 3 have been introduced for the purpose of illustrating typical prior art systems in which analog switches (14 and 36) have been employed. The problems involved in the utilization of analog switches have been previously mentioned herein and it is one of the primary objects of the present invention to provide an analog multiplexing system in which the utilization of analog switches is avoided. Such a system in accordance with the invention is illustrated in the block diagram of FIG. 4.

Figure 4:
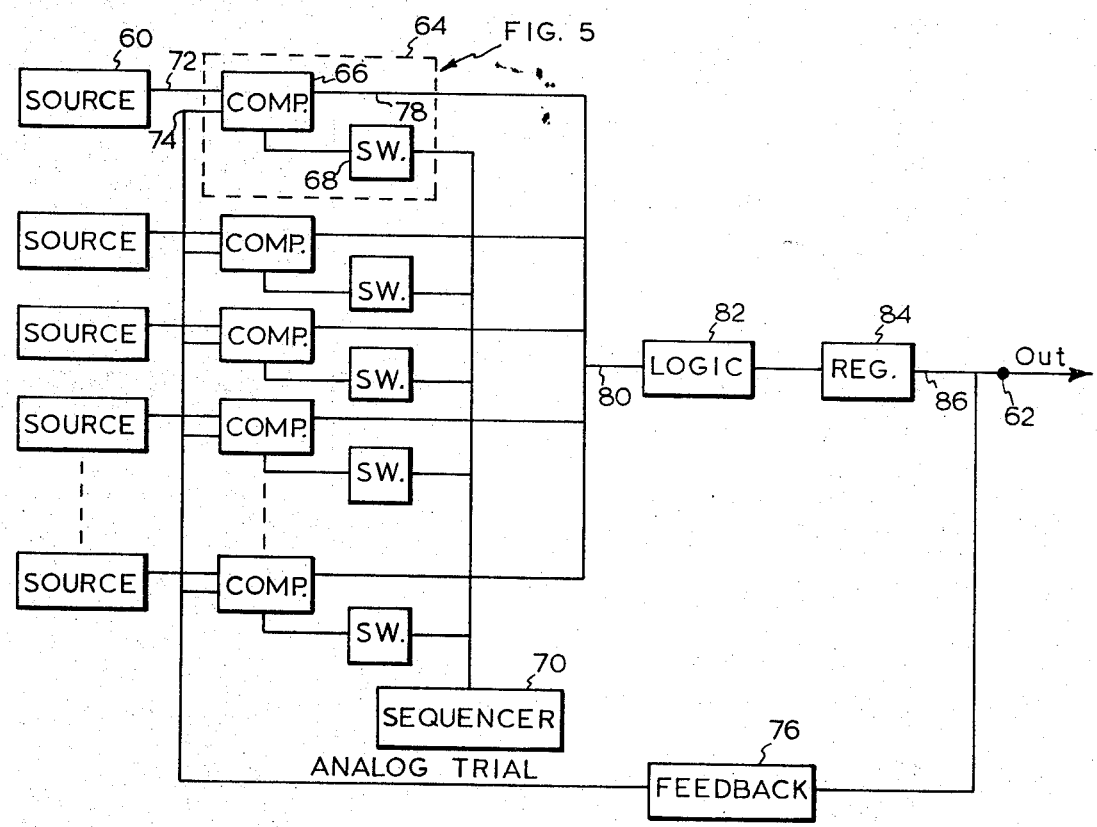
FIG. 4 is a block diagram of an analog multiplexing system in accordance with the present invention.

As in the systems of FIGS. 1 and 3, the system of FIG. 4 is intended to sequentially sample a plurality of analog signal sources 60 to provide a time multiplexed output signal (PAM, PDM, or PCM) at system output terminal 62. In accordance with the system of FIG. 4, a different comparison means 64 is provided for each analog signal source 60. Each comparison means 64 includes a gated comparator circuit 66 and a switch means 68. Each switch means 68 is capable of defining an on state which enables the gated comparator circuit 66 coupled thereto and an off state which disables the gated comparator circuit. The states of the switch means 68 are controlled by a sequencing means 70.

The gated comparator circuit 66 functions to compare an analog signal applied thereto on input terminal 72 by one of the sources 60 with an analog trial signal applied thereto on input terminal 74 by feedback means 76.

Each gated comparator circuit 66 is provided with an output terminal 78. All of the output terminals 78 are connected in common and to the input terminal 80 of logic circuitry 82. The output terminal of logic circuitry 82 is connected to a register 84 whose output terminal 86 is connected both to the system output terminal 62 and to the feedback means 76.

Figure 6:
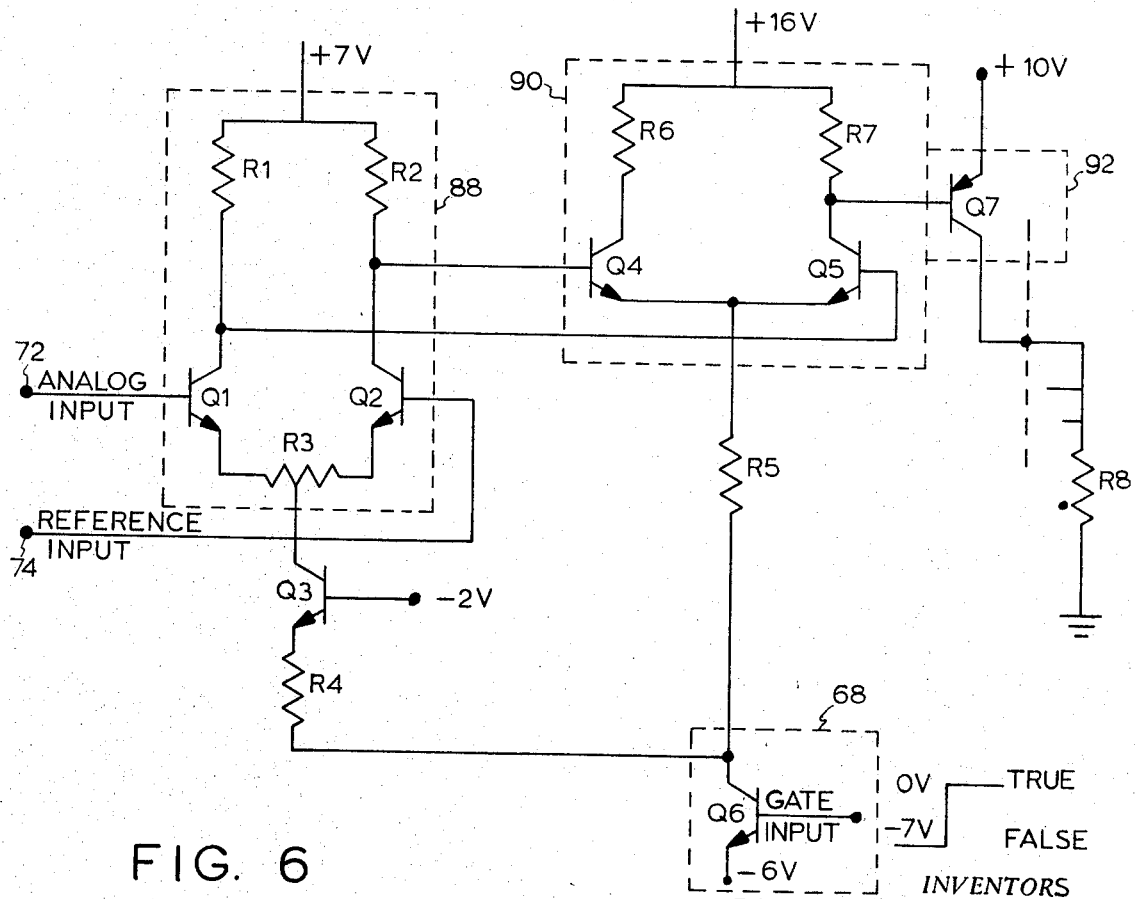
FIG. 6 is a circuit diagram of a preferred embodiment of the comparison means of FIG. 5.

In the system of FIG. 4, only one gated comparator 66 is enabled at a time. All of the other comparator circuits are disabled, and as will be discussed in conjunction with FIG. 6, are not powered and define open circuits. The enabled comparator circuit functions to compare the amplitude of the analog trial signal provided by feedback means 76 with the analog signal provided by the connected source 60. As in FIG. 3, the comparator circuit 66 need merely define a binary output signal indicating whether or not the amplitude of the analog trial signal exceeds the ampiltude of the analog signal applied on terminal 72. Accordingly, inasmuch as the signal appearing on the common output terminal 78 is binary, accuracy is no longer a problem. This is considerably different from the system of FIG. 3, for example, wherein signal appearing at the common output terminal of the switches 36 was analog, therefore requiring great accuracy. In other words, whereas capacitive loading, crosstalk, stray couplings, etc. seriously degraded the accuracy of multiplexing systems of the type shown in FIGS. 1 and 3, such effects are negligible in the system of FIG. 4.

It is pointed out that the functioning of the logic circuitry 82 and register 84 of FIG. 4 are analogous to the functioning of the logic circuitry 50 and register 52 in FIG. 3 for the PDM and PCM applications. The general block diagram of FIG. 4 is however additionally applicable where a PAM output is desired to the extent that a comparing means 64 is also utilized for each source 60. However, in the PAM application, the logic circuitry 82 and register 84 are not necessary and the output of each comparison circuit 66 can be coupled directly both to the system output terminal and back through the feedback path to the terminals 74 of the comparison circuit.

Figure 5:
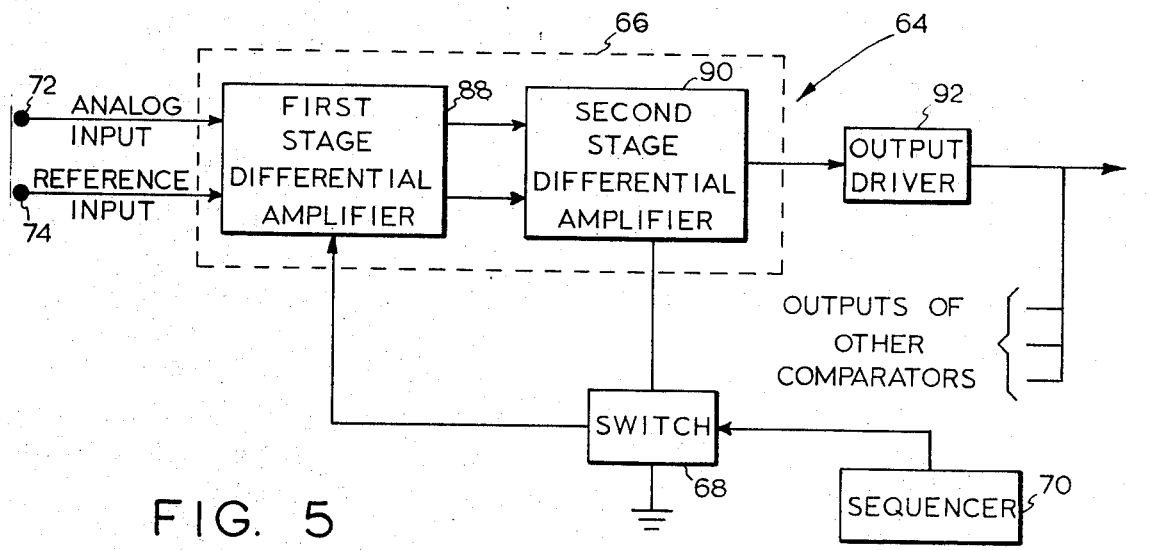
FIG. 5 is a block diagram of a comparison means in accordance with the present invention for use in the system of FIG. 4.

Attention is now called to FIG. 5 which illustrates a comparison means particularly well suited for use as the comparison means 64 of FIG. 4. It is desirable that the input impedance to the comparison means for the analog trial signal appear as an open circuit so that only the on or enabled comparator 66 acts to load the trial signal source (i.e. the feedback means 76). Additionally, it is desirable that only the enabled comparator 66 be powered. That is, the disabled comparators preferably should dissipate no power. However, disabled comparators should provide isolation between the source of analog trial signal and the signal coupled to logic circuitry 82. Additionally, each comparator, when non-powered, should present a near open circuit to the analog signal source connected thereto.

As shown in FIG. 5, a comparison means 64 in accordance with the invention is comprised of a comparator 66 and a switch means 68. The comparator 66 can include one or more differential amplifier stages 88 and 90. Previously referred to terminals 72 and 74 are connected to the first stage differential amplifier 88. Both differential amplifier stages 88 and 90 are controlled by the output of the switch means 68 whose state is controlled by a selection signal from the sequencing means 70. The output of the stage 90 is coupled to an output driver 92 which, as shown in FIG. 4, is connected in common with the outputs of all of the other comparators 66.

Briefly, when the input selection signal from the sequencing means 70 applied to the switch means 68 is false, no power is consumed by the comparator 66. Although no power is consumed, voltage is applied and the configuration acts to reverse bias the inputs as will be described in greater detail in connection with FIG. 6. With power removed, the biasing and configuration is so chosen that all comparator outputs can be tied directly together as shown in FIG. 4. However, it is pointed out that to minimize adverse failure modes, some additional multiplexing may be utilized at the comparator outputs.

Attention is now called to the circuit diagram of FIG. 6 illustrating a preferred embodiment of the comparison means 64 of FIG. 5. It will be noted therein that the first stage differential amplifier 88 is comprised of first and second NPN transistors Q1 and Q2. The collectors of transistors Q1 and Q2 are respectively connected through resistors R1 and R2 to a source of positive potential, herein illustrated as +7 volts. The emitters of transistors Q1 and Q2 are connected together by a resistor R3. Previously referred to input terminals 72 and 74, are respectively connected to the bases of transistors Q1 and Q2.

An NPN transistor Q3 couples the first stage amplifier 88 to the switch means 68. More particularly, the collector of transistor Q3 is connected to substantially the midpoint of resistor R3. The base of transistor Q3 is connected to a source of negative reference potential, herein shown as −2 volts. The emitter of transistor Q3 is connected through a resistor R4 to the switching means 68.

The second differential amplifier stage 90 is comprised of NPN transistors Q4 and Q5. The collectors of transistors Q1 and Q2 are respectively connected to the bases of transistors Q4 and Q5. The emitters of transistors Q4 and Q5 are connected in common and through a resistor R5 to the switch means 68. The collectors of transistors Q4 and Q5 are respectively connected through resistors R6 and R7 to a source of positive potential, herein shown as +16 volts.

The switch means 68 is comprised of an NPN transistor Q6. The collector of transistor Q6 is connected to the previously referred to resistors R4 and R5. The emitter of transistor Q6 is connected to a source of negative reference potential, herein illustrated as −6 volts. The selection signal from sequencing means 70 is applied to the base of transistor Q6. A true selection signal will be assumed to have a zero volt potential and a false selection signal a −7 volt potential.

The collector of transistor Q5 is connected to the output driver 92 which is comprised of PNP transistor Q7. The emitter of transistor Q7 is connected to a source of positive reference potential, herein shown as +10 volts. The collector of transistor Q7 is connected in common with the corresponding terminal of all of the other comparators through resistor R8 to a reference potential such as ground.

In the operation of the circuit of FIG. 6, initially assume the application of a false or −7 volt potential applied to the base of transistor Q6. As a consequence, transistor Q6 is cut off thereby depriving emitter current from transistors Q1, Q2, Q4, and Q5. Although no current flows in the differential amplifier stages 88 and 90, it can be seen that the collector of transistor Q6 is at +7 volts (less the base emitter drop across transistor Q4) and this potential acts to reverse bias the base emitter loop of transistor Q3 which acts as a constant current emitter source for transistors Q1 and Q2. Thus, with no emitter current flowing in transistors Q1 and Q2, both the analog input applied to terminal 72 and reference input applied to terminal 74 are not loaded and are isolated from each other. Also, since no emitter current can flow in transistors Q4 and Q5, the collector potential of transistor Q5 is at +16 volts and therefore the base emitter junction of transistor Q7 is reverse biased. Thus, output current through the load resistor R8 from the transistor Q7 of a disable comparator is zero. For this reason, a number of comparators can be bridged together directly as shown in FIG. 4 since the off units do not couple any output to the common load R8.

When the selection signal applied to the base of transistor Q6 is true, transistor Q6 is saturated and the collector thereof is clamped to −6 volts plus the collector emitter drop. Now emitter biasing currents can flow and normal differential amplifier performance is achieved. The single end output is then at either ground or a positive potential (e.g. five volts) depending upon whether the analog input signal is greater or less than the analog trial signal. The output of the comparator is digital with the result that significant degration of the binary levels can be tolerated with no penalty to accuracy.

From the foregoing, it should be appreciated that an improved analog multiplexing system has been disclosed herein which avoids the use of analog switches and the problems introduced thereby by directly connecting a different gated comparison means to each analog signal source. Although particular embodiments of the invention have been illustrated and described herein, it is recognized that modifications and variations will occur to those skilled in the art.

What is claimed is:

1. A system for use with a plurality of analog signal sources for developing a time multiplexed output signal, said system comprising:
    a plurality of comparator means each coupled to a different one of said analog signal sources;
    each of said comparator means including a comparator and a switch means capable of defining first and second states for respectively enabling and disabling said comparator;
    a sequencing means coupled to all of said switch means controlling the states thereof;
    an output terminal;
    means connecting all of said comparators to said output terminal; and
    feedback means coupling said output terminal to all of said compartators wherein:
        said feedback means provides an analog trial signal to said comparators; and
        each of said comparators comprises differential comparator means which when enabled provides a binary output signal indicative of whether or not the amplitude of said analog trial signal exceeds the amplitude of the analog signal provided by the analog signal source coupled thereto.

2. The system of claim 1 wherein:
    each of said comparators includes a differential amplifier having first and second input terminals respectively connected to one of said analog signal sources and to said feedback means; and
    means coupling said switch means to said differential amplifier for preventing conduction therein in response to said switch means defining said first state.

3. The system of claim 2 wherein said differential amplifier includes first and second transistors, each having a base, an emitter and a collector;
    means respectively connecting said first and second input terminals to said bases of said first and second transistors; and
    means connecting said switch means to said first and second transistor emitters for reverse biasing the base-emitter junctions thereof in response to said switch means defining said first state.

4. The system of claim 3 wherein said switch means comprises a third transistor having a base, an emitter, and a collector;
    means coupling said third transistor emitter to a source reference potential;
    means coupling said third transistor collector to said emitters of said first and second transistors; and
    means coupling said third transistor base to said sequencing means.

5. The system of claim 1 wherein each of said comparators includes a differential amplifier having first and second input terminals respectively connected to one of said analog sources and to said feedback means; and
    means coupling said switch means to said differential amplifier for preventing conduction therein in response to said switch means defining said first state.

6. The system of claim 1 including intermediate processing means connected between said comparators and said output terminal for converting said binary output signal provided by each comparator to a representation of the amplitude of the analog signal provided by the analog source coupled thereto.

7. In combination with a plurality of sources each providing an anolog signal, means for developing a multiplexed output signal therefrom, said means including:
    a plurality of comparator means each including a comparator and a switch means coupled thereto;
    each of said comparators having first and second input terminals and an output terminal;
    means applying each of said analog signals to a different one of said first input terminals;
    each of said switch means capable of defining first and second states for respectively enabling and disabling the comparator coupled thereto;
    sequencing means for respectively controlling the states of said plurality of switch means;
    output means;
    means coupling all of said comparator output terminals to said output means;
    feedback means responsive to said output means for applying an analog trial signal to all of said second input terminals and
    each of said comparators comprises differential comparator means providing a binary output signal indicative of whether or not the amplitude of said analog trial signal exceeds the amplitude of the analog signal applied thereto.

8. A system for use with a plurality of analog signal sources for developing a time multiplexed output signal, said system comprising:
    a plurality of differential comparator means having two inputs, one input being coupled to a different one of said analog signal sources;
    each of said comparator means including a comparator and a switch means capable of defining first and second states for respectively enabling and disabling said comparator;
    a sequencing means coupled to all of said switch means for controlling the states thereof;
    an output terminal;
    means connecting all of said comparators to said output terminal; and
    feedback means coupling said output terminal to the other input of each of said comparator means.

9. In combination with a plurality of sources each providing an analog signal, means for developing a multiplexed output signal therefrom, said means including:
    a plurality of differential comparator means each including a comparator and a switch means coupled thereto;
    each of said comparators having first and second input terminals and an output terminal;
    means applying each of said analog signals to a different one of said first input terminals;
    each of said switch means capable of defining first and second states for respectively enabling and disabling the comparator coupled thereto;

sequencing means for respectively controlling the states of said plurality of switch means;

output means;

means coupling all of said comparator output terminals to said output means; and feedback means responsive to said output means for applying an analog trial signal to all of said second input terminals.

References Cited

UNITED STATES PATENTS

| | | | |
|---|---|---|---|
| 3,051,901 | 8/1962 | Yaeger | 179—15 |
| 3,207,986 | 9/1965 | Bailey | 179—15 |
| 3,258,538 | 6/1966 | Searcy | 179—15 |
| 3,335,228 | 8/1967 | Thompson et al. | 179—15 |

KATHLEEN H. CLAFFY, Primary Examiner

D. L. STEWART, Assistant Examiner

UNITED STATES PATENT OFFICE
CERTIFICATE OF CORRECTION

Patent No. 3,535,458     Dated October 20, 1970

Inventor(s) Robert E. Gottfried and Barry Dunbridge

It is certified that error appears in the above-identified patent and that said Letters Patent are hereby corrected as shown below:

Column 2, line 37, delete "separator" and insert --separate--;

Column 3, lines 46 and 47, delete "capacities" and insert --capacitive--;

Column 4, line 24, change "ot" to the word --to--;

Column 5, line 32, insert after "wherein" the word --the--;

Column 7, line 40, insert after the second "means" the word --for--;

Column 8, line 3, insert after the word "source" the word --of--.

SIGNED AND SEALED
JAN 19 1971

(SEAL)
Attest:

Edward M. Fletcher, Jr.
Attesting Officer

WILLIAM E. SCHUYLER, JR.
Commissioner of Patents